Feb. 14, 1961     H. L. BAUMBACH ET AL     2,971,448
LIGHT MODULATING APPARATUS FOR FILM PRINTER
Filed June 7, 1956
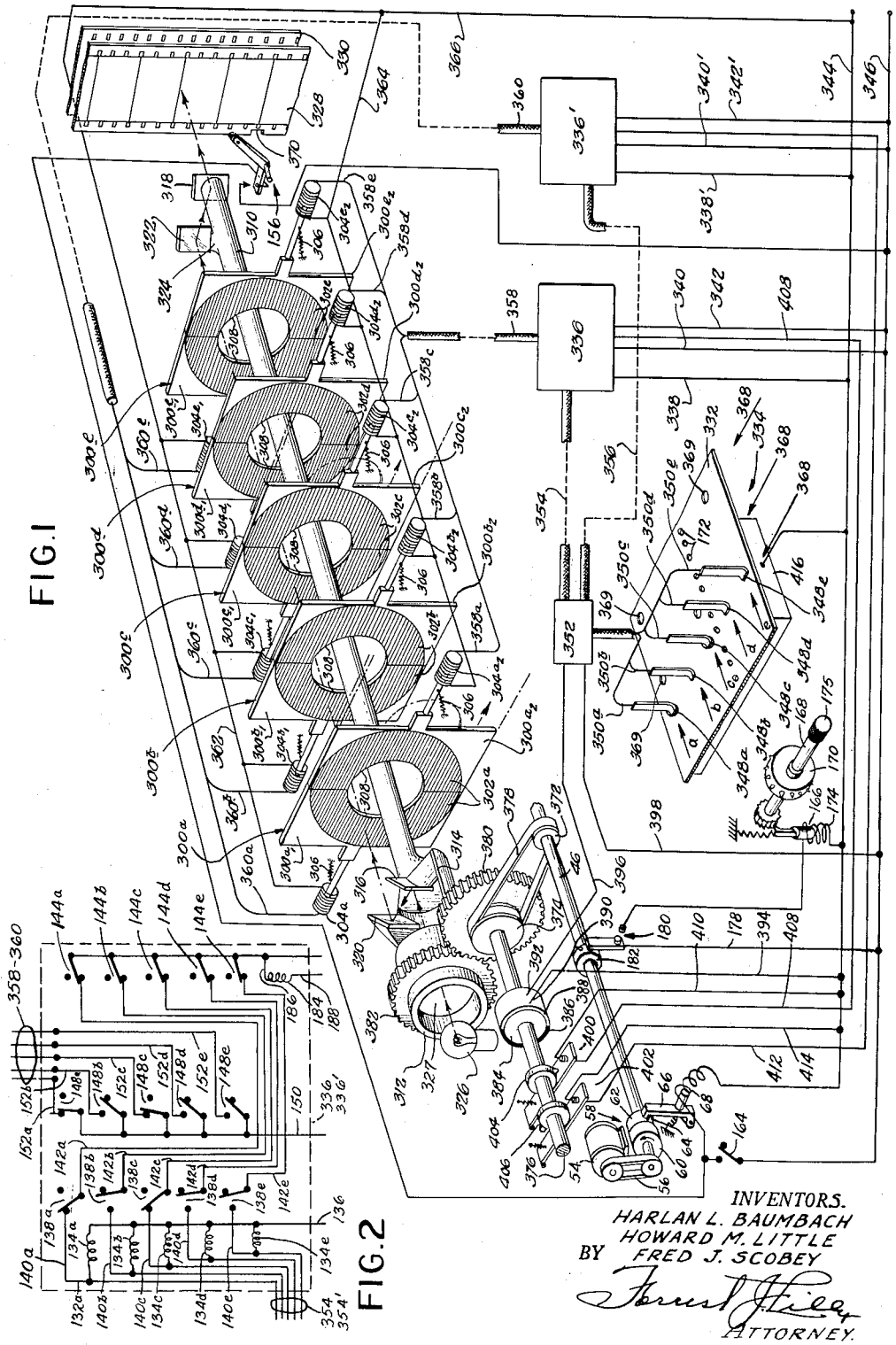
INVENTORS.
HARLAN L. BAUMBACH
HOWARD M. LITTLE
BY FRED J. SCOBEY
ATTORNEY.

United States Patent Office 2,971,448
Patented Feb. 14, 1961

2,971,448

LIGHT MODULATING APPARATUS FOR FILM PRINTER

Harlan L. Baumbach and Howard M. Little, Los Angeles, and Fred J. Scobey, Canoga Park, Calif., assignors to Unicorn Engineering Corporation, Los Angeles, Calif., a corporation of California Filed June 7, 1956, Ser. No. 589,989

17 Claims. (Cl. 95—75)

This invention relates to the printing of motion picture film and particularly to a system for modulating printing light intensity and/or color composition to obtain desired print density and/or hue.

When printing a negative motion picture film onto positive film stock, it is generally necessary that the intensity and/or color composition of the printing light impinging on the negative be changed as successive scenes are printed to compensate for the varying lighting conditions under which such scenes are exposed. One typical light modulating system for the prior art, which may be considered for purpose of explaining the problems involved in such systems comprises, generally, five neutral density light filters arranged in parallel planes and mounted for reciprocable movement between positions of insertion in the printing light beam and retracted positions out of the light beam. The filters are normally retained in the light beam by biasing springs attached to the filters and are adapted to be selectively retracted out of the beam by selective energization of solenoids operatively connected to the filters.

The light densities of the five filters vary in proportion to the series 1, 2, 4, 8 and 16, the arrangement being such that by selective positioning of the filters in the printing beam, thirty different light intensities, corresponding to thirty equal increments of photographic print density, may be obtained. While this prior reciprocable filter arrangement for obtaining different printing light values function satisfactorily for some purposes, it has been found to possess certain inherent deficiencies which preclude its use for high quality photographic prints.

Thus, assume a situation wherein during the printing of a given scene, a certain filter is positioned in the printing light beam, and the light change required for printing of the next following scene involves the retraction of that filter and the insertion of another. During the first half of the transition from one light condition to the other, the filter being removed from the beam will increase the intensity of one-half the beam from the value determined by the density of that filter to the full intensity of the source, while the filter being inserted is decreasing the intensity of the other half of the beam from the original value to a value determined by the combined densities of the two filters. Thus at the midpoint of the transition, with the two filters positioned half in and half out of the beam, half the beam bypasses both filters, and half passes through both filters. Now, in certain cases, the total light passing the filters at this transition point under these conditions is not necessarily a value intermediate the initial and final values determined by the densities of the fully inserted original and replacement filters, but may be greater than either the initial or the final value of the light. Accordingly, under these conditions one or more positive frames under transition conditions may be over exposed, resulting in dark flashes on the projection screen when the film is projected.

A similar result is also obtained due to the fact that each filter is actuated by an independent mechanism. The several filter actuating mechanisms are identical in so far as precision manufacture permits and, in the case of the filter solenoids, are simultaneously energized and de-energized. Due, however, to slight differences in the physical constants of the several filters, such as friction and mass, and in the operating characteristics of the solenoids, and to the fact that the filters are actuated in one direction by springs, which cannot be perfectly matched, and in the other direction by solenoids, exact synchronization in the retraction and insertion of the filters is difficult if not impossible to achieve.

Unsynchronized filter movement may result, for example, in one filter being retracted only one-fourth of the way out of the printing beam while another filter being inserted may have been moved three fourths of the way into the beam. Such a condition may cause under exposure of one or more frames of the positive film, resulting in a light flash upon projection. Conversely, more rapid retraction of one filter than insertion of another may cause over-exposure, resulting in a dark flash upon projection.

Again, because filters being removed are moved by solenoids, while those being inserted are moved by springs, and because of the difference in operating characteristics between solenoids and springs, it is not possible in any event, with this prior system, to remove filters at the same speed as filters are inserted.

With all these variables to contend with, the prior system fails to achieve satisfactory transition from one light condition to the next.

In color printing operations there exists, in addition to the above discussed problem of obtaining proper printing light intensity, the problem of achieving desired hue in the positive print. Thus, when printing color film, the color composition, as well as the intensity, of the printing light must be controlled so that the several scenes of the resulting positive print will possess the desired hue and density.

With the foregoing preliminary remarks in mind, the primary object of this invention may be stated as being the provision of a light modulating system of the general class described wherein changes in printing light intensity and/or color composition are progressive directly from one value to the next.

The foregoing and other objects are attained by an arrangement such that during each printing light change, the filter elements being retracted from the beam and the filter elements being inserted into the beam have precisely synchronized movement in the same direction relative to the beam, with the latter filter elements immediately following the former filter elements.

Accordingly, at any given instant of time during a light change, one portion of the beam will be directed through the filter elements being retracted and the remainder of the beam will be directed through the filter elements being inserted, the first portion of the beam becoming progressively smaller as the last mentioned filter elements are moved into the beam, until the entire beam is directed through the latter filter elements at the termination of the light change. Thus, the change in intensity and/or color composition of the printing light beam at the negative will be progressive from one light condition to the next so as to produce a progressive blending of the print densities and hues between scenes of the positive print.

The illustrative form of the invention comprises two sets of filter plates and a printing light beam which is shifted during succeeding light changes in a manner to pass through said filter plate sets in alternate sequence, one of said sets being pre-set to obtain desired printing light conditions for one scene of the negative while the printing beam is directed through the other set for printing of the preceding scene. During each light change the beam moves from one set of filter plates directly to the other set without interruption to produce at the negative a progressive transition from one printing light condition to the next.

The filter elements may comprise neutral density filters of varying density when only changes in printing light intensity are desired, as in the printing of black and white film, or the filter elements may comprise groups of filters in which the filters of each group vary in density and the groups of filters vary in color so that changes in the color composition, as well as the intensity of the printing light, may be accomplished for printing of color film. Alternatively, in a color printing system using three beams of colored light, e.g., red, green, and blue, a group of neutral density filters may be used in each beam.

Predetermined periodic relative movement of the filter elements and printing light beam, to accomplish the several predetermined light changes required during the printing of a given negative, is achieved by operation of a punched tape control system cued in response to notches formed in the negative film at points where light changes are desired.

With the foregoing preliminary remarks in mind, reference is now had to the following detailed description of the invention and the accompanying drawings in which:

Fig. 1 schematically illustrates one form of the present light modulating system; and Fig. 2 illustrates the internal circuitry of certain relay circuits embodied in the system of Fig. 1.

The illustrative light modulating system comprises a series of five, spaced parallel filter elements $300a$–$300e$ each including a pair of separate, coplanar filter plates identified by subscripts 1 and 2, respectively. The pair of plates in each filter element are mounted on suitable supporting structure, not shown, for independent movement, in their plane, between the solid line positions, hereinafter referred to as "extended positions," and the dotted line position in which filter $300a$ is shown, hereinafter referred to as the "retracted positions." Thus, either of the filter plates of any given pair of plates is adapted for selective positioning in either its retracted or extended position irrespective of the positioning of the other filter plate of that pair. When both of the filter plates of a given pair are in their extended positions, their inner edges abut one another, as shown, so as to form, in effect, a continuous single plate. Moreover, the several filter plates are accurately alined so that said abutting inner edges thereof lie in a common plane when all the filter plates are in their extended positions, stops, not shown, being provided for limiting inward movement of a given filter plate to said extended position when its opposite filter plate is in its retracted position.

Each filter plate is formed with a generally semi-annular filter segment, as indicated at $302a$–$302e$, the filter segments extending to the inner edges of their respective plates so that when both plates of a given pair of plates are in their extended positions, the filter segments form substantially continuous filter rings. The light densities of these filter rings vary in proportion to the series 1, 2, 4, 8 and 16 in the well-known way.

Associated with the filter plates are solenoids $304a_1$–$304e_1$, and $304a_2$–$304a_2$, respectively, which are adapted to be selectively energized, as hereinafter described, to retract their respective filter plates against the action of biasing springs 306 which normally retain the plates in their extended solid line positions.

The inner, or opposing, edges of the filter plates are semi-circularly notched at 308 to define central alined openings through the several filter elements $300a$–$300e$. Extending through these alined openings, in substantially coaxial relationship with the filter rings on the filter plates, when the latter are positioned as shown, is a rotatable shaft 310 which is supported in suitable bearings, not shown, as will presently be more fully described. One end of shaft 310 rigidly mounts a hollow sleeve 312 a portion of whose wall is cut away at 314. Fixed to opposite ends of the shaft, in alinement with its axis of rotation, are a first pair of mirrors 316 and 318, and a second pair of mirrors 320 and 322 are mounted on the shaft in positions radially offset from said axis. The latter mirror is fixedly carried, for example, on a radial extension 324 on the shaft while mirror 320 is fixed to sleeve 312 in the cutaway portion 314 thereof, as shown.

A stationary light source 326 is disposed on the shaft axis at the open end of sleeve 312, and through the aid of a suitable lens 327, a beam of light is directed from this source along the shaft axis onto mirror 316. This mirror and the other mirrors 320, 322, and 318 are inclined to the shaft axis and positioned relative to one another in the manner illustrated, so that said light beam will be reflected from mirror 316 onto mirror 320 and thence through the several filter elements 300 in parallel, radially offset relation to the shaft, onto mirror 322. From this latter mirror the beam is directed onto mirror 318 and is thence reflected, again in coincidence with the shaft axis, through a negative film strip 328 onto positive film stock 330. The radial positioning of the mirrors 320 and 322 is such that said beam will be directed through the filter rings or segments $302a$–$302e$ of the several filter elements 300.

From the description thus far it will be seen that if the shaft 310 is rotated, with light source 326 energized, the radially offset portion of the light beam which traverses the several filter elements, when the latter are extended, as shown, will pass alternately through the sets of filter plates $300a_1$–$300e_1$, and $300a_2$–$300e_2$, and the intensity of the beam impinging on the negative 328 will be dependent upon the number of said filter plates which are in extended position wherein their respective filter segments 302 lie in the beam.

The filter plates, when in their retracted positions, will be out of the path of the radially offset portion of the beam so that by selective positioning of the several filter plates of either set of plates thirty different light intensities, corresponding to thirty equal increments of print density, may be obtained at the negative.

During operation of the invention, as will shortly be more fully explained, shaft 310 is rotated through one-half a revolution during each light change so that during the printing of a given scene of the negative, the printing light beam will be directed through those filter plates at one side of the shaft which are extended and during the printing of the next following scene, the printing light beam will be directed through those filter plates at the other side of the shaft which are extended. It will be evident from what follows that it is immaterial whether the shaft 310 is rotated through successive half revolutions, always in the same direction or is oscillated through successive half revolutions first in one direction of rotation, and then the other. An example of the first type will now be described.

To accomplish intermittent rotation of shaft 310 and selected positioning of the filter plates 300, a punched tape control system is employed. This control system embodies a punched tape 332 which is fed through a reader 334. Indicated at 336 and 336' are a pair of identical relay circuit means which control, respectively, the filter plate solenoids $304a_2$–$304e_2$ and $304a_1$–$304e_1$. Fig. 2 illustrates the internal circuitry of each of these relay circuit means.

In this figure, $132a$–$132e$ are leads which extend from one end of relay coils $134a$–$134e$, respectively. The other ends of these coils are tied to a common lead 136. The relays have normally open contacts $138a$–$138e$, respectively. One terminal of these relay contacts are connected to leads $132a$–$132e$, respectively, via leads $140a$–$140e$.

Leads $142a$–$142e$ extend from the other terminals of the relay contacts $138a$–$138e$ to one terminal of holding relay contacts 144a–144e, respectively. The other terminals of these latter contacts are tied to a common lead 146. The coil 184 of the holding relay has one end connected to lead 146 and the other end connected to a lead 188.

Relays 134a–134e have a second set of normally open contacts 148a–148e, respectively. One terminal of these contacts are tied to a common lead 150. Leads 152a–152e extend from the other terminals of these contacts, respectively.

In Fig. 1, leads 338, 340 and 342 connect to the internal leads 136, 150 and 146, respectively, of relay circuit 336. Similarly, leads 338', 340' and 342' connect to the internal leads 136, 150 and 146 of relay circuit 336'. Leads 338 and 338' are tied to one A.C. supply lead 344. Leads 340, 340', 342 and 342' are all tied to the other A.C. supply lead 346.

Punched tape reader 334 includes a series of five contacts or brushes 348a–348e which are connected via leads 350a–350e, respectively, to a solenoid actuated transfer switch means 352. When energized, this switch means places said brushes in circuit with relay circuit means 336, and when de-energized, places said brushes in circuit with relay circuit means 336', through multi-conductor cables 354 and 356, respectively. Cable 354 comprises the five leads 132a–132e of relay circuit 336 while cable 356 comprises the five leads 132a–132e of relay circuit 336'. Corresponding terminals of solenoids $304a_2$–$304e_2$ are connected to relay circuit means 336 through leads 358a–358e which connect via a cable 358 to the internal leads 152a–152e, respectively, of circuit 336. Corresponding terminals of solenoids $304a_1$–$304e_1$, are connected to relay circuit means 336' through leads 360a–360e which connect via a cable 360 to the internal leads 152a–152e, respectively, of circuit 336'. The other terminals of solenoids $304a_1$–$304e_1$, and $304a_2$–$304e_2$ are connected through leads 362 and 364 and a common lead 366 to A.C. supply lead 344.

The punched control tape 332 is preformed, in the well-known way, with several control groups 368 of light change perforations 369 by an operator who initially views the negative to be printed and provides each control group 368 with such perforations as will yield the desired printing light intensity.

Thus, each control group 368 may contain a perforation in any one or more of five positions designated as a–e in Fig. 1. Each of these positions is associated with correspondingly lettered ones of the filter plate solenoids $304a_1$–$304e_1$ and $304a_2$–$304e_2$, and a perforation in any position results in energizing of the associate solenoid. That is to say, placing a perforation in position a of any control group results in energizing of one or the other of the filter plate solenoids $304a_1$ or $304a_2$, depending on the state of the transfer switch 352, while placing a perforation in position b of any control group results in energizing of solenoids $304b_1$ or $304b_2$, and so on.

When the transfer switch 352 is energized, the solenoids $304a_2$–$304e_2$ are connected to the reader brushes 348a–348e and are selectively energized in accordance with the perforations present in the control group 368 currently aligned with the reader brushes. Similarly, when the transfer switch 352 is deenergized, the solenoids $304a_1$–$304e_1$ are connected to the reader brushes and are selectively energized in accordance with the perforations present in the aligned control group.

Indicated at 46 in Fig. 1 is a shaft which is coupled to a motor 54 through a belt drive 56 and a single revolution clutch 58. Motor 54 is continuously energized during a film printing operation.

The single revolution clutch 58, which may comprise any conventional single revolution clutch mechanism, has, for convenience, been illustrated as consisting of a pair of abutting friction plates 60 and 62. Clutch plate 60 is driven by the motor 54 and clutch plate 62 is fixed to shaft 46, as shown. When the clutch plate 62 is free to rotate, therefore, shaft 46 is driven by the motor 54.

Clutch plate 62 has a radial projection or shoulder 64 normally engaged by a pivoted spring-biased stop 66 which restrains the clutch plate 62 against rotation with the clutch plate 60. The stop is retracted, against the action of its spring, to permit rotation of the clutch plate 62 through a single revolution with the clutch plate 60 by a solenoid 68. One end of the coil of this solenoid is connected to A.C. lead 344. The other end of the coil is connected to the other A.C. lead 346 through a normally open film switch 156 which is closed for a brief instant of time in response to passage of each cueing notch 370 in the developed film 328 past the film switch. Each time a cueing notch 370 moves past the film switch 156, therefore, the single revolution clutch 58 is momentarily energized to effect a single revolution of shaft 46.

Shaft 46 mounts a pulley 372 around which and a larger pulley 374 on a shaft 376 is trained a drive belt 378. Pulley 374 and a gear 380, meshing with and of the same size as a gear 382 on sleeve 312, are fixed to shaft 376 so that rotation of shaft 46 produces rotation of shaft 310. The diameters of pulleys 372 and 374 are in the ratio of 2:1 so that for each single revolution of shaft 46, shaft 376, and, therefore, shaft 310 and that portion of the printing light beam which traverses the filter elements, are turned through 180°.

During operation of this latter form of the invention, as will shortly be more fully described, one of the sets of filter plates $304a_1$–$304e_1$ or $304a_2$–$304e_2$ are pre-set to obtain the desired printing light for one scene of the negative while the printing beam is directed through the other set during printing of the preceding scene. To this end, there is fixed to shaft 376 a slip ring assembly 384 comprising an insulating segment 386 and an electrically conductive segment 388 each of 180° circumferential extent, as shown. Bearing against this slip ring assembly are a pair of contact brushes 390 and 392 the former of which is connected to A.C. supply lead 344 through a lead 394 and the latter of which is connected to one terminal of the solenoid operated transfer switch 352 through a lead 396. The other terminal of this transfer switch is connected through a lead 398 to the other A.C. supply lead 346. The arrangement is such that with the shaft 376 positioned, as shown in Fig. 12, contacts 390 and 392 engage the conducting segment 388 of the slip ring so that switch means 352 is energized to place filter solenoids $304a_2$–$304e_2$ in circuit with the reader brushes. When the shaft 376 is rotated through 180°, contacts 390 engage the insulating segment 386 of the slip ring so that switch means 352 is de-energized to place the other set of filter solenoids $304a_1$–$304e_1$ in circuit with the reader brushes.

Control tape 332 is adapted to be advanced from one control group to the next during each revolution of shaft 46 by operation of a ratchet feed device 166 which operates to step a shaft 168 carrying a sprocket 170 engaged with sprocket holes 172 in the tape. For each energizing of the coil 174 of the device 166, shaft 168 is stepped to advance the tape 332 from one control group 368 to the next. Shaft 168 carries a knurled handle 175 for manual advancing of the tape.

Coil 174 has one terminal connected to A.C. supply lead 344 through a lead 176 and its other terminal connected to the other A.C. supply lead 346 through a lead 178 including a normally open switch 180. This latter switch is arranged to be closed once during each revolution of the shaft 46 by means of a cam 182 carried on the shaft.

Indicated at 400 and 402 are a pair of normally closed switches which are adapted to be opened, in the sequence described below, by a pair of cams 404 and 406 fixed to shaft 376. Switch 400 has one terminal connected, through a lead 408, to the internal holding relay lead 188 in relay circuit 336. The other terminal of switch 400 is connected to A.C. supply lead 344 by lead 410 so that the holding relay coil 184 in relay circuit 336 is normally energized to hold its contacts 144a–144e in their normally closed positions, as already noted.

Similarly, one terminal of switch 402 is connected, through lead 412 to the internal holding relay lead 188 in relay circuit 336'. The other terminal of switch 402 is connected to A.C. supply lead 344 by lead 414 so that the holding relay coil 184 in circuit 336' is also normally energized. The relative angular positions of cams 404 and 406 on shaft 376 and of the control tape advancing cam 182 on shaft 46 are such that momentary opening of switches 400 and 402, by their respective cams 404 and 406, to open the holding contacts 144a–144e in their associated relay circuits 336 and 336' occurs after each advancing of the control tape and after the shaft 310 has been rotated through more than 90°, as will presently be more fully explained.

Operation of the invention is as follows.

Assuming the parts to be initially positioned as shown in Fig. 1 and the control tape 332 to contain the perforations shown, it will be seen that contact brushes 390 and 392 contact the conducting segment 388 of the slip ring 384 so that the transfer switch 352 is energized to place relay circuit 336, associated with filter solenoids $304a_2$–$304e_2$, in circuit with reader brushes 348a–348e.

Accordingly, upon manual advancing of the control tape to the first control group 368, containing perforations in positions a and c, in the illustrated tape, brushes 348a and 348c contact reader platen 416 to energize filter solenoids $304a_2$ and $304c_2$ and move their respective filter plates $300a_2$ and $300c_2$ to their retracted positions, the filter plates $300b_2$, $300d_2$ and $300e_2$ remaining in their extended positions.

The one revolution clutch 58 is initially actuated, either by an initial cueing notch 370 in the leader portion (not shown) of the negative film 328 or by momentary closing of a manual switch 164 in parallel with the film switch 156, to produce an initial single revolution of shaft 46 and therefore turning of shafts 376 and 310 through 180°. The radially offset portion of the printing light beam, from source 326, which traverses the filter elements, is thereby rotated with shaft 310 to a position, displaced 180° from that shown in Fig. 1, wherein the beam is directed through the three extended filter plates $300b_2$, $300d_2$, $300e_2$. The intensity of the printing light beam at the negative will, accordingly, be of the proper intensity for the first scene of the negative.

The angular orientation of the segments 386 and 388 of slip ring 384 on shaft 376 is such that after shaft 310 has been rotated through an angle sufficiently greater than 90° to assure passage of the entire cross-section of the printing beam through the filter plates $300b_2$, $300d_2$ and $300e_2$, contact brushes 390 and 392 engage the insulating segment 386 of the slip ring 384. Transfer switch 352 is thereby de-energized to disconnect the reader brushes from relay circuit means 336 and connect the brushes to relay circuit means 336'. Those of the filter plate solenoids $304a_2$–$304c_2$ namely, $304a_2$ and $304c_2$, which were energized in response to the presence of their corresponding perforations in the first control group are, however, retained in energized condition by the holding contacts 144a–144e in relay circuit means 336.

Shortly after the reader brushes have thus been placed in circuit with relay circuit means 336', control tape 332 is advanced to the second control group by cam 182, and cam 406 on shaft 376 is rotated into engagement with switch 402 to momentarily open the latter and momentarily de-energize the holding coil 184 in relay circuit means 336'. Upon the second control group on the control tape 332 becoming alined with the read brushes, filter plate solenoids $304a_1$–$304e_1$ are energized and their filter plates $300a_1$–$300e_1$ are positioned in accordance with the perforations in the second control group. In the illustrative control tape, plates $300a_1$ and $300e_1$ will be retracted while plates $300b_1$, $300c_1$ and $300d_1$ will be retained in their extended positions. It will be seen that the positioning of the latter filter plates occurs while the printing light beam is directed through the other set of filter plates so that the system is pre-set for the next following light change.

Upon the one revolution clutch 58 being actuated in response to momentary closure of the film switch 156 by the next cueing notch in the negative, shaft 46 is again rotated through one revolution while shafts 376 and 310 are again turned through 180° back to the position shown in Fig. 1.

Turning of shaft 310 through an angle somewhat greater than 90°, so that the printing light beam is directed entirely through those of the filter plates $300a_1$–$300e_1$ which remain in their extended positions, in accordance with the perforations in the second control group, namely plates $300b_1$, $300c_1$ and $300d_1$, again brings the conducting segment 388 of slip ring 384 into engagement with contact brushes 390 and 392 to re-energize the transfer switch 352 and reconnect the reader brushes to relay circuit means 336. The control tape 332 is then advanced to the third control group and cam 404 is rotated into engagement with switch 400 to momentarily open the holding circuits in relay circuit means 336 so that the filter plates $300a_2$–$300e_2$ will be pre-set in accordance with the perforations in the third control group while the printing light beam is being directed through those filters $300a_1$ and $300e_1$ which remain extended in accordance with the second control group.

Thus, it will be seen that the printing beam will be directed through the filter plate sets $300a_1$–$300e_1$ and $300a_2$–$300e_2$ in alternate sequence, and that while the printing beam is being directed through one of said sets, for printing of one scene of the negative, the other of the sets will be pre-set for printing of the next following scene of the negative. Since the beam moves from one set of filter plates directly to the other across the abutting, bounding edges of the filters, a progressive light change is produced.

It will be apparent from the foregoing discussion that this invention provides means for accomplishing simultaneous, uni-directional movement, relative to the printing light beam, of one set of light filters being retracted from the beam and another set of light filters being inserted into the beam with the latter filters immediately following the former in their movement relative to the beam so that during a light change, the beam will relatively move from said one set of filters directly to the other set to produce a progressive change in printing light conditions.

The expression "different light transmission characteristics" in the appended claims is intended to encompass light filters of different densities which transmit light in the same region of the spectrum as well as light filters of the same or different light density which transmit light in different regions of the spectrum.

While a single preferred form of the invention has been described and illustrated, it will be appreciated that numerous modifications in design, instrumentalities, and arrangement of the parts will be apparent to those skilled in the art within the scope of the following claims.

We claim:

1. In film printing apparatus having means for directing a printing light beam through a developed film strip and toward a strip of raw film stock, light modulating means for said beam comprising at least two light filters possessing different light transmission characteristics located in transverse planes of the beam, said two filters being relatively movable for independent positioning relative to the beam and being positionable with given bounding edges thereof in a common plane paralleling the beam and with the two filters lying at opposite sides of said common plane, means for effecting relative movement between said beam and said filters along transverse direction lines of said common plane to shift the relative positions of the beam and filters between a first position in which said beam passes totally through one of the filters and a second position in which the beam passes totally through the other of said filters in such manner that the relative positions of said filters remain fixed and relative transition of the beam from said one filter to said other filter occurs across said given bounding edges of the filters whereby said given bounding edges intersect common longitudinal direction lines of the beam at each instant of said relative transition.

2. The subject matter of claim 1 wherein the planes in which said filters are located are spaced along the beam.

3. In film printing apparatus having means for directing a printing light beam through a developed film strip and toward a strip of raw film stock, light modulating means for said beam comprising at least two light filters possessing different light transmission characteristics and which are independently movable for selective positioning in the beam, said filters being located in transverse, longitudinally spaced planes along the beam and having given bounding edges aligned as viewed in the direction of the beam, the filters extending in opposite transverse directions of the beam, and means for laterally shifting said beam between a first position wherein the beam passes entirely through one filter and a second position wherein the beam passes entirely through the other filter in such manner that relative transition of the beam from one filter to the other occurs across said given bounding edges.

4. In film printing apparatus having means for directing a printing light beam through a negative film strip and toward a strip of raw film stock, light modulating means for said beam comprising a pair of equal density light filters each located in a plane transverse of the beam and movable in its plane between extended and retracted positions, means for effecting relative movement between the beam and filters between a first position in which the beam passes through one of the filters and a second position in which the beam passes through the other filter when the filters are in extended positions, said filters having bounding edges which relatively cross the beam during relative shifting of the latter from one filter to the other with the filters in extended positions, and said filters in their extended positions being so positioned as to have said bounding edges thereof intersect common longitudinal direction lines of the beam at each instant during said relative shifting of the beam, said filters being out of the path of the beam in their retracted positions.

5. The subject matter of claim 4 including a control system for selectively positioning one filter in its extended and retracted positions while the beam is in its position associated with the other filter.

6. In film printing apparatus having means for directing a printing light beam through a negative film strip and toward a strip of raw film stock, light modulating means for said beam comprising at least two pairs of filters located in transverse planes of and spaced along the beam, the filters of each pair of filters having the same density and the pairs of filters having different densities, the filters being movable in their planes between extended and retracted positions, means for effecting relative movement between the beam and filters between a first position in which the beam passes through one of the filters of each pair of filters and a second position in which the beam passes through the other filter of each pair of filters when the filters are in extended positions, said filters having bounding edges which relatively cross the beam during relative movement of the latter between said first and second positions with the filters extended, said filters in extended position having said bounding edges positioned so as to intersect common longitudinal direction lines of the beam during said relative crossing of the latter by said bounding edges, the filters being out of the path of the beam in their retracted positions.

7. The subject matter of claim 6 wherein said one filter of both pairs of filters together comprise a first filter set and the other filters of the pairs of filters comprise a second filter set, and a control system for selectively positioning the filters of one of said sets in their extended and retracted positions while the beam is in its relative position associated with the other set of filters.

8. The subject matter of claim 6 wherein said filters are stationary and said beam is moved relative to the filters.

9. The subject matter of claim 4 including means for selectively moving said filters in their planes between said extended and retracted positions comprising a punched tape control system including an electrical means associated with each of said filters and adapted to be selectively energized by operation of said control system to position its respective filter in one of said positions, means for positioning the filters in their other position when their associated electrical means are deenergized, lock-in means in circuit with said electrical means for retaining the latter energized after initial energization thereof by said control system, and switch means in circuit with said lock-in means and operated by said actuating means for momentarily deactivating said lock-in means in response to operation of said actuating means.

10. In film printing apparatus having means for directing a printing light beam through a developed film strip and toward a strip of raw film stock, light modulating means for said beam comprising at least two light filters possessing different light transmission characteristics and having bounding edges, means supporting said filters for independent movement in transverse planes of said beam to position the filters with given bounding edges thereof intersecting common direction lines paralleling the beam whereby said bounding edges are aligned as viewed in the direction of said direction lines, and with the filters located at opposite sides of said direction lines, and means for effecting relative movement between said beam and filters along transverse direction lines of the beam to shift the relative positions of said beam and filters between a first position in which the beam passes totally through one filter and a second position in which the beam passes totally through the other filter in such manner that the relative positions of said filters remain fixed and relative transition of the beam from said one filter to said other filter occurs across said aligned bounding edges of the filters whereby said aligned bounding edges intersect common longitudinal direction lines of the beam at each instant of said relative transition.

11. The subject matter of claim 10 wherein said filters are spaced longitudinally of the beam.

12. The subject matter of claim 10 wherein said filters are stationary and said last-mentioned means comprises means for moving the beam past the filters.

13. In film printing apparatus having means for directing a printing light beam through a developed film strip and toward a strip of raw film stock, light modulating means for said beam comprising a plurality of independently positionable light filters possessing different light transmission characteristics and located in transverse, longitudinally spaced planes along said beam, said filters being independently positionable in their respective planes to locate selected filters in the beam with given bounding edges of the filters in the beam and given bounding edges of the filters out of the beam aligned and located in a common plane parallel to the beam, and means for effecting relative movement between said beam and filters along transverse direction lines of the beam to shift the relative positions of the beam and filters to a position wherein said selected filters are located out of the beam and other filters are located in the beam in such manner that relative transition of the beam from said selected filters to said other filters occurs across said aligned bounding edges and the direction of relative movement of said selected filters and said other filters with respect to the beam is the same.

14. In film printing apparatus having means for directing a printing light beam through a developed film strip and toward a strip of raw film stock, light modulating means for said beam comprising a series of detached light filters possessing different light transmission characteristics and located in transverse, longitudinally spaced planes along the beam, said filters having parallel bounding edges, means supporting said filters for independent positioning of the latter in their respective planes to locate selected ones of said filters in the beam and others of the filters out of the beam with given bounding edges of said selected filters and said other filters aligned in the direction of the beam, and means for effecting relative movement between said filters and beam along transverse direction lines of the beam to shift the relative positions of the filters and beam from the position wherein said beam passes through said selected filters to a position wherein said selected filters are located out of the beam and the latter passes through said other filters in such manner that the relative positions of said selected filters and other filters remain fixed during the relative transition of the beam from the selected filters to said other filters and said relative transition of the beam occurs across said aligned bounding edges of said selected and other filters, whereby said aligned bounding edges intersect common longitudinal direction lines of the beam during each instant of said relative transition.

15. The subject matter of claim 14 wherein said filters comprise neutral density light filters, the light densities of which vary in accordance with the series 1, 2, 4, 8 and 16.

16. In film printing apparatus having means for directing a printing light beam through a developed film strip and toward a strip of raw film stock therebehind, light modulating means for said beam comprising five light filter means arranged in parallel transverse, longitudinally spaced planes of the beam and having different light transmission characteristics which are in proportion to the series 1, 2, 4, 8 and 16, said filter means being independently positionable in their respective planes to selectively locate the filter means in and out of the beam with given bounding edges of those filter means in the beam and given bounding edges of those filter means out of the beam aligned lengthwise of the beam in a common plane parallel to the beam, the filter means in the beam extending to one side of said common plane and the filter means out of the beam extending to the other side of said common plane, and mean to effect relative movement between at least some of the filter means and the beam along transverse direction lines of said common plane to selectively relocate the filter means in and out of the beam in such a manner that the relative positions of those filter means which are relocated with respect to the beam remain unchanged and relative transition of the beam to or from the relocated filter means occurs across said given bounding edges of the latter filter means whereby the latter edges intersect common longitudinal direction lines of the beam at each instant of said relative transition.

17. In film printing apparatus having means for directing a printing light beam through a developed film strip and toward a strip of raw film stock, light modulating means for said beam comprising light filters having different light transmission characteristics, said filters being relatively movable for independent positioning thereof relative to the beam, drive means for effecting relative movement between said beam and filters to selectively position the latter in the beam and out of the beam, said drive means including a single motor for effecting said relative movement between the beam and said filters in unison, a punched tape adapted to be preformed with groups of control perforations, a tape reader including reader brushes through which said control tape is intermittently advanced in response to cueing notches in the developed film strip to successively aline said control groups and reader brushes, each of said control groups having several positions equal in number to the number of said filters in each of which positions a perforation may be formed and each of said positions being associated with a respective one of said brushes and filters, electrical means associated with each of said filters and connected in circuit with the respective reader brush for selective energization of said electrical means in accordance with the perforations present in each control group alined with the reader brushes, said filters being relatively positioned in and out of the printing beam by operation of said motor in accordance with energization of the electrical means, lock-in circuit means associated with each of said electrical circuit means for retaining the latter energized after initial energization thereof by operation of the tape reader, and switch means in circuit with said lock-in means and actuated by said motor for momentarily deactivating said lock-in means in response to operation of said drive means to effect relative movement between the printing beam and light filters.

References Cited in the file of this patent
UNITED STATES PATENTS

| | | |
|---|---|---|
| 1,463,737 | Debrie | July 31, 1923 |
| 2,300,970 | Riess | Nov. 3, 1942 |
| 2,518,947 | Simmon | Aug. 15, 1950 |
| 2,557,182 | Forgett | June 19, 1951 |
| 2,566,277 | Williams | Aug. 28, 1951 |
| 2,689,879 | Rehorn | Sept. 21, 1954 |
| 2,711,121 | Barsam | June 21, 1955 |